United States Patent [19]

Rittler

[11] Patent Number: 5,336,645
[45] Date of Patent: Aug. 9, 1994

US005336645A

[54] SOLUBLE, CELLULATED MOLD AND FOAMABLE MIXTURE

[75] Inventor: Hermann L. Rittler, Corning, N.Y.

[73] Assignee: Corning Incorporated, Corning, N.Y.

[21] Appl. No.: 127,313

[22] Filed: Sep. 27, 1993

[51] Int. Cl.$^5$ ............................................. C04B 38/10
[52] U.S. Cl. ........................................ 501/84; 501/85; 106/38.9; 106/605
[58] Field of Search .................... 501/80, 84, 81, 100, 501/101, 109, 115, 123, 125, 127, 85; 264/41, 42, 45.6, 50, 51; 106/38.3, 38.35, 600, 601, 602, 605, 38.9; C04B 38/10

[56] References Cited

U.S. PATENT DOCUMENTS

| | | | |
|---|---|---|---|
| Re. 33,366 | 10/1990 | Barrall | 501/84 |
| 865,314 | 9/1907 | Osborn | . |
| 3,155,477 | 11/1964 | Swarts | 65/23 |
| 4,102,664 | 7/1978 | Dumbaugh, Jr. | 65/23 |
| 4,112,170 | 9/1978 | Rauscher | 428/212 |
| 4,156,614 | 5/1979 | Greskovich et al. | 106/38.9 |
| 4,207,113 | 6/1980 | Yoshino et al. | 501/84 |
| 4,666,867 | 5/1987 | Beall et al. | 501/5 |
| 4,880,453 | 11/1989 | Coppola et al. | 65/23 |
| 5,100,452 | 3/1992 | Dumbaugh, Jr. | 65/23 |

*Primary Examiner*—Karl Group
*Assistant Examiner*—Paul Marcantoni
*Attorney, Agent, or Firm*—Milton M. Peterson

[57] ABSTRACT

A soluble thermally cellulated, ceramic mold member, having gas evolved cells dispersed in a soluble crystalline matrix, the matrix consisting predominantly of at least one crystal phase selected from the group consisting of borates and phosphates of alkali metals, of divalent metals and of aluminum, and boron phosphate, and having at least one solubilizing agent selected from alkali metal compounds, divalent metal compounds and charred acrylic resin. A mixture capable of being thermally foamed to a cellulated body, the mixture consisting essentially of at least one phosphorous-containing compound, at least one boron-containing compound, at least one solubilizing agent selected from the group consisting of alkali metal compounds, divalent metal compounds and acrylic resins, at least one organic binder and a gas-evolving agent.

19 Claims, No Drawings

SOLUBLE, CELLULATED MOLD AND FOAMABLE MIXTURE

FIELD OF THE INVENTION

A soluble, cellulated, ceramic mold and a thermally foamable mixture to produce the mold.

BACKGROUND OF THE INVENTION

Numerous techniques have been proposed for producing thermally cellulated bodies from such diverse materials as glasses, ceramics and organic plastics. It is customary to introduce a source of gas, either in a parent batch or in a granular mixture of the prepared material. Such known cellulated products are generally intended to be durable and resistant to attack.

The cellulated materials of the present invention find particular application in low temperature casting of organic plastics and soft metals at temperatures up to 500° C. However, they may also be useful in casting other molten materials, such as glasses and metals, at higher temperatures.

It is common foundry practice to employ sand molds in casting molten metals, such as iron. Such molds are composed essentially of sand grains mixed with an organic binder, such as pitch. The binder burns out during casting, and the mold readily breaks away from the casting.

For certain intricate shapes, it has been proposed to use molds produced from granulated and bonded glass. Also, chemically machinable, glass-ceramic materials have been proposed as mold materials. Such molds are also removed mechanically.

The concept of readily removable mold materials, particularly core materials, is embodied in the lost wax process. In that process, for example, a solid wax core is formed as a base upon which to build a mold shape. Once the mold shape is formed, the wax is melted and removed. This procedure, of course, does not directly provide a mold, nor does it provide a mold that is readily soluble.

Recently, a technique has been proposed for forming glass bodies having a pristine surface that is free from mold marks. This technique involves molding the desired glass body with a surface layer of a relatively soluble glass. This soluble glass layer receives any mold marks, or other imperfections, and is dissolved away to leave the desired surface. The procedure, as well as families of soluble glasses for use in the procedure, are disclosed in U.S. Pat. Nos. 5,100,452 (Dumbaugh, Jr.) and 4,102,664 (Dumbaugh, Jr.). While this procedure is very useful for its purpose, it is apparent that it does not produce a cellulated body, and could not function to provide mold materials for casting purposes.

My co-pending application, Ser. No. 07/630,544, filed Dec. 20, 1990, now abandoned and refiled on Jul. 1, 1993 as Ser. No. 08/086,515, discloses an amorphous, polymeric material that contains phosphorous, aluminum and carbon atoms. This material may be thermally foamed at relatively low temperatures on the order of 300° C. to produce a crystallized matrix having gas-filled, or vacuum-filled, cells dispersed throughout the matrix. The matrix may be essentially an aluminophosphate crystal phase or a mixture of alumino and borophosphate crystal phases.

A second co-pending application of mine, Ser. No. 07/732,906, filed Jul. 19, 1991 as a continuation-in-part of Ser. No. 07/630,813, filed Dec. 20, 1990, discloses a refractory body assembly. This assembly includes a barrier layer in an intermediate space between a refractory container and a honeycomb-type, refractory body positioned within the container. The barrier layer is a rigid, cellulated layer produced from the foamable material of the first mentioned application. There is no suggestion in these applications that the cellulated materials might be solubilized, or of the disclosed materials being suitable for use as mold materials.

It would be desirable to provide a light weight mold composed of a cellulated material capable of withstanding elevated temperatures such as encountered in casting processes. Such a material would be particularly useful if it could be readily removed, for example, following the casting process. This would greatly facilitate casting of regular shapes, as well as shapes having intricate designs. It is a basic purpose of the present invention to provide such desirable cellulated bodies, and mixtures adapted to their production.

SUMMARY OF THE INVENTION

The invention resides in a soluble, thermally cellulated, ceramic mold member having gas-evolved cells dispersed in a soluble crystalline matrix, the matrix consisting predominantly of at least one crystal phase selected from the group consisting of borates and phosphates of alkali metals, of divalent metals and of aluminum, and boron phosphate, and having at least one solubilizing agent selected from alkali metal compounds, divalent metal compounds and charred acrylic resin.

The invention further resides in a mixture capable of being thermally foamed to a cellulated body, the mixture consisting essentially of at least one phosphorous-containing compound, at least one boron-containing compound, at least one solubilizing agent selected from the group consisting of alkali metal compounds, divalent metal compounds and acrylic resins, at least one organic binder and a gas-evolving agent.

PRIOR ART

In addition to the art previously described, United States Patents of possible interest are set forth in an accompanying statement.

DESCRIPTION OF THE INVENTION

The product of the invention is a foamed, inorganic body, that is, a body having cells dispersed within a crystalline matrix. The foamed body is produced by thermal treatment of a foamable mixture, that is, a mixture containing materials reactive to produce the crystalline matrix and a gas-evolving agent to produce the cells as the matrix forms.

The cells may contain a gas, such as $CO_2$, $SO_2$, $N_2$, $H_2O$, $Cl_2$, $NH_3$, or $H_2$, depending on the gas-evolving agent. They may also be essentially under vacuum, as is the case where the gas forming the cells condenses on cooling, for example, steam in closed cells. Normally, the cells in my product are formed by steam, but are not under vacuum since they are predominantly "open" cells.

The crystalline matrix comprises a primary crystalline phase, boron phosphate ($BPO_4$), or a solubilized form thereof, such as an alkaline borate or borophosphate. In addition, the matrix may contain a wide variety of reactive additives and/or inert fillers.

A unique feature of my foamed material is the combination in one material of properties of light weight, ability to withstand elevated casting temperatures, for example, up to 1500° C., and solubility in water or weak acid solution. These features make the material particularly useful for production of mold members for casting organic plastics at temperatures up to 500° C. The mold member may be a core around which a molten material is cast. Alternatively, it may be an exterior mold within which the molten material is cast and cooled.

In either form, the cellular mold material is produced by heating a thermally foamable mixture at a low temperature not over about 400° C., preferably about 300° C. The foamable mixture basically comprises a compound containing phosphorous, a compound containing boron, a solubilizing compound selected from the alkali metal oxides and certain hydrated alkaline earth metal compounds, a gas evolving agent and an organic binder.

Any source of phosphorous may be employed. Commercial phosphoric acid, $H_3PO_4$ (85% by weight) is a convenient source. However, various phosphates, such as aqueous solutions of ammonium mono-, or di-, basic phosphate, or a metal phosphate, such as calcium phosphate, may be employed, providing the additional ions are desired, or may be tolerated. The ammonium phosphates may be desirable as a solvent where boric oxide is to be incorporated in the material.

The boron source may be the oxide. However, I prefer to use a borate compound, such as ammonium or zinc borate. Boric acid may be used where a weak acid reaction with an alkali metal is desired.

Aluminum phosphate crystal phases tend to be relatively insoluble. However, as indicated later, such materials may be rendered soluble. Where the foamable material includes an aluminum compound, the oxide may be employed. However, I prefer a hydrated or hydroxide form.

The solubilizing compound may be an alkali metal compound, in particular, a sodium, lithium, or potassium compound. I have determined that additions to a mixture of various alkali metal compounds, and certain divalent metal compounds including certain alkaline earths, as well as halides, will produce ceramic foams with the desired solubility characteristics. Typically, the alkali metaborate and metaphosphate compositions offer superior solubility characteristics. The most soluble ceramic foam was the sodium metaborate. The other alkalies show lesser degrees of solubility with lithium compounds showing the slowest of the alkali metal compound solution rates.

Certain alkaline earth metaborates and metaphosphates also showed good solubilities, though not as rapid as obtained with alkali borates and phosphates. Magnesium compositions were the slowest to dissolve, and strontium-barium containing compositions the most soluble. Other additions enhancing solubility were zinc, manganese, vanadium, ferrous iron and cuprous ion. The halide which produced the most soluble foams generally was chloride ion.

I have also found that acrylic resins can function as a solubilizing agent. These resins tend to decompose and leave a carbon char during thermal foaming. It is believed this char functions as a blocking agent in the matrix that facilitates solubility.

Any of the commonly used gas evolving agents, also referred to as blowing agents, may be employed. However, I prefer to employ steam as a cellulating agent. Accordingly, I employ hydrated materials, for example, hydrated alkali borates. These react with a relatively weak acid, for example, boric or phosphoric acid, to produce a salt and steam.

Ceramic foam compositions are typically made using numerous types of fillers and binders to achieve the desired theological properties for forming requirements.

A mineral type filler, such as cordierite, may be employed to improve the refractory characteristics. This may be conveniently supplied as a pulverized, cordierite glass-ceramic, that is a glass-ceramic in which the principal crystal phase is cordierite. Where refractoriness is less important, as in lower temperature casting molds, less refractory fillers, such as talc or a clay, may be used to reduce cost.

As will appear later, the solubility rate tends to increase with the amount of solubilizing agent. At the same time, the density of the cellulated products decreases. These features may be offset by a decrease in refractoriness. Thus, depending on the degree of refractoriness needed, a balance may be struck between the nature and amount of solubilizing agent and the nature and amount of filler.

It is apparent, then, that the compositions of the mixtures employed to produce soluble, cellulated molds in accordance with the invention may vary rather widely. For most purposes, however, I prefer to employ a mixture composed of, in parts by weight, 30–60 parts of a phosphorous compound, 10–30 parts of a boron compound, 10–60 parts of a solubilizing agent and 10–50 parts of other solids, in particular fillers. In addition, the presence of organic binders and water, as needed to provide a moldable mixture and for cellulation, is contemplated.

The organic binder may be any of the commercially available organic compounds and materials known for that purpose. These include one or more members selected from the following organic groups: cellulosics, alcohols, epoxies, phenolics, melamines, acrylamides, acrylates, gums, alginates, silastics and poly butenes. Also utilized as additives are some commercial blowing agents containing ingredients typified by tartaric acid, and various surfactants.

The invention is further described with respect to specific embodiments. TABLE I sets forth eight soluble ceramic foam compositions, expressed in terms of parts by weight, illustrating the effect of increasing the amount of a solubilizing agent, in this case, sodium carbonate ($Na_2CO_3$), in the composition. Compositions 1–4 and 5–8 represent two different composition groups. In each group the single difference in composition between group members is the $Na_2CO_3$ content.

Test pieces were prepared based on each batch. The dry materials were mixed and placed in a 150 ml beaker. Liquids were then added and the batch mixed by stirring. The mixture was weighed, heated to 400° C. in air, held for two hours, cooled and weighed again to determine weight loss. The resulting solid foam was removed from the beaker and a cube about an inch (2.5 cm) on a side was cut from the mass. The cube was weighed and placed in water acidified with nitric and sulfuric acids to a pH of four for 24 hours. The remainder of the cube, if any, was washed, dried and weighed to determine weight loss.

TABLE 1 further sets forth the percent weight loss after the 400° C. heat treatment; the density of the fired body; and the percent weight loss in the 24 hour solubility test.

TABLE I

|  | 1 | 2 | 3 | 4 | 5 | 6 | 7 | 8 |
|---|---|---|---|---|---|---|---|---|
| $(NH_4)_2HPO_4$ | 48 | 48 | 48 | 48 | — | — | — | — |
| $(NH_4)_2B_4O_7 \cdot 4H_2O$ | 26 | 26 | 26 | 26 | — | — | — | — |
| $H_3PO_4$ | — | — | — | — | 46 | 46 | 46 | 46 |
| $B(OH)_3$ | — | — | — | — | 25 | 25 | 25 | 25 |
| Cordierite | 26 | 26 | 26 | 26 | 26 | 26 | 26 | 26 |
| $SnF_2$ | 5 | 5 | 5 | 5 | 5 | 5 | 5 | 5 |
| Colloidal $SiO_2$ | 10 | 10 | 10 | 10 | 10 | 10 | 10 | 10 |
| $Na_2CO_3$ | — | 10 | 20 | 43 | 10 | 20 | 43 | 60 |
| Binders | 20 | 20 | 20 | 20 | 20 | 20 | 20 | 20 |
| $H_2O$ | 9 | 25 | 60 | 35 | 10 | 5 | 3 | — |
| % Fired Wt. Loss | 41.5 | 46.6 | 52.3 | — | 39.3 | 34.9 | 34.3 | 33.4 |
| Density | 0.963 | 0.784 | 0.393 | — | 0.971 | 0.751 | 0.173 | 0.106 |
| % Wt. Loss Solubility | 15.4 | 32.4 | 51.3 | 100 | 8.4 | 19.7 | 100 | 100 |

Soluble foams may also be obtained by simply adding a soluble material which is compatible with the basic crystalline foam composition. Although the $BPO_4$ foams are the most readily soluble the $AlPO_4$ and $Al:-BPO_4$ composition combinations may also be solubilized using this technique.

TABLE 2 sets forth a further series of compositions, expressed in terms of parts by weight, illustrating different salts of divalent and monovalent cations that are effective as solubilizing agents. A batch was prepared and treated in the same manner as described for the compositions of TABLE I. The weight loss on heating to 400° C. in air, and the consequent density, are shown. In each case, the material completely dissolved in the solubility test. Each fired sample was examined by X-ray diffraction analysis. These analyses showed phases of $BPO_4$, cordierite, or both, in each test piece.

TABLE 2

|  | 9 | 10 | 11 | 12 | 13 | 14 | 15 | 16 | 17 | 18 | 19 |
|---|---|---|---|---|---|---|---|---|---|---|---|
| $(NH_4)_2HPO_4$ | 48 | 48 | 48 | 48 | 48 | 48 | 48 | 48 | 48 | 48 | 48 |
| $(NH_4)_2B_4O_7 \cdot 4H_2O$ | 26 | 26 | 26 | 26 | 26 | 26 | 26 | 26 | 26 | 26 | 26 |
| Cordierite | 26 | 13 | — | 15 | 15 | 15 | 15 | 15 | 15 | 15 | 26 |
| Bentonite | — | — | — | 15 | 15 | 15 | 15 | 15 | 15 | 15 | 25 |
| $SiO_2$ | — | — | — | 15 | 15 | 15 | 15 | 15 | 15 | 15 | 15 |
| Binders | 13 | 13 | 13 | 17 | 22 | 18 | 18 | 17 | 17 | 17 | 12 |
| $H_2O$ | 19 | 16 | 10 | 5 | 15 | 5 | 5 | 36.7 | 15 | 15 | 10 |
| $Na_3HPO_4 \cdot 12H_2O$ | 20 | — | — | — | — | — | — | — | — | — | — |
| $LiBO_2 \cdot 2H_2O$ | — | 15 | — | — | — | — | — | — | — | — | — |
| $LiCO_3$ | — | — | 20 | — | — | — | — | — | — | — | — |
| $MgBr_2 \cdot 6H_2O$ | — | — | — | 30 | — | — | — | — | — | — | — |
| $Mg(NO_3)_2 \cdot 6H_2O$ | — | — | — | — | 30 | — | — | — | — | — | — |
| $Li_3PO_4$ | — | — | — | — | — | 30 | — | — | — | — | — |
| $Mn(H_2PO_2)_2 \cdot H_2O$ | — | — | — | — | — | — | 30 | — | — | — | — |
| $Sr(NO_3)_2$ | — | — | — | — | — | — | — | 30 | — | — | — |
| $Ba(NO_3)_2$ | — | — | — | — | — | — | — | — | 30 | — | — |
| $KNO_3$ | — | — | — | — | — | — | — | — | — | 30 | — |
| Acrylic Resin | — | — | — | — | — | — | — | — | — | — | 15 |
| % Fired Wt. Loss | 46.4 | 47.1 | 53.9 | 49.3 | 52.7 | 39.2 | 34.1 | 52.3 | 41.4 | 49.2 | 40.5 |
| Density | 0.343 | 0.233 | 0.543 | 0.637 | 0.496 | 0.86 | 0.97 | 0.750 | 1.029 | 0.447 | 0.753 |
| % Wt. Loss Solubility | 100 | 100 | 100 | 100 | 100 | 100 | 100 | 100 | 100 | 100 | 100 |

I claim:

1. A ceramic mold member having open cells dispersed in a matrix that is predominantly a soluble crystal phase selected from the group consisting of borates, borophosphates and phosphates of alkali metals, divalent metals, aluminum, manganese, vanadium and copper, the mold member dissolving and disintegrating in an aqueous medium.

2. A mold member in accordance with claim 1 that is a core.

3. A mold member in accordance with claim 1 that is a hollow mold.

4. A mold member in accordance with claim 1 wherein the matrix has an alkali metal borate and/or phosphate crystal phase.

5. A mold member in accordance with claim 1 wherein the matrix has a boron phosphate crystal phase.

6. A mold member in accordance with claim 1 wherein the cells are thermally cellulated.

7. A mold member in accordance with claim 1 wherein the selected crystal phase contains an alkali metal.

8. A mold member in accordance with claim 7 wherein the alkali metal is sodium.

9. A mixture capable of being thermally foamed to a cellulated body, the mixture consisting essentially of at least one phosphorous-containing compound, or at least one boron-containing compound, or a mixture of boron- and phosphorous-containing compounds in sufficient amounts to produce a soluble borate, phosphate, or borophosphate crystal phase, and at least one solubilizing agent selected from the group consisting of compounds of an alkali metal, a divalent metal, manganese, vanadium and copper halides, and acrylic resins, the selected solubilizing agent being present in an amount sufficient to form a soluble borate, phosphate, or borophosphate crystal phase with the boron, phosphorous, or boron-phosphorous mixture compounds present, the mixture further containing at least one organic binder and a gas-evolving agent, and optionally containing a filler.

10. A mold member in accordance with claim 9 wherein the selected solubilizing a gent is charred acrylic resin.

11. A mixture in accordance with claim 9 containing a phosphorous compound selected from the group consisting of phosphoric acid and phosphate compounds.

12. A mixture in accordance with claim 9 containing a boron compound selected from boric acid and borate compounds.

13. A mixture in accordance with claim 9 wherein the selected solubilizing agent is an alkali metal compound.

14. A mixture in accordance with claim 13 wherein the alkali metal is sodium.

15. A mixture in accordance with claim 9 wherein the solubilizing compound is a divalent metal compound selected from strontium and barium compounds.

16. A mixture in accordance with claim 9 wherein the gas-evolving agent is water.

17. A mixture in accordance with claim 9 containing at least one hydrated compound.

18. A mixture in accordance with claim 9 containing a chloride compound.

19. A mixture in accordance with claim 9 comprising, in parts by weight, 30–60 parts of a phosphorous-containing compound, 10–30 parts of a boron-containing compound, 10–60 parts of a solubilizing agent and 10–50 parts fillers, plus binders and water in sufficient amount for molding and cellulation of the mixture.

* * * * *